United States Patent
Rizkin

[19]
[11] Patent Number: 6,028,535
[45] Date of Patent: *Feb. 22, 2000

[54] INTEGRATED APPROACH LIGHTING SYSTEM AND METHOD OF USE THEREOF

[75] Inventor: Alexander Rizkin, Rendondo Beach, Calif.

[73] Assignee: farLight Corporation, Torrance, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/803,974

[22] Filed: Feb. 21, 1997

Related U.S. Application Data

[63] Continuation-in-part of application No. 08/636,798, Apr. 22, 1996, Pat. No. 5,629,996, which is a continuation of application No. 08/564,596, Nov. 29, 1995, abandoned.

[51] Int. Cl.[7] ..................................................... B64F 1/18
[52] U.S. Cl. ........................... 340/955; 340/954; 340/953
[58] Field of Search ..................................... 340/947, 952, 340/953, 954, 955, 956; 385/31; 342/33, 54

[56] References Cited

U.S. PATENT DOCUMENTS

| | | | |
|---|---|---|---|
| 2,441,877 | 5/1948 | Flett | 340/955 |
| 2,458,414 | 1/1949 | Penton | 340/955 |
| 2,549,860 | 4/1951 | Swanson | 340/952 |
| 3,771,120 | 11/1973 | Bonazoli et al. | 340/953 |
| 3,885,876 | 5/1975 | Konopka | 340/955 |
| 4,532,512 | 7/1985 | Tanner | 340/964 |
| 5,119,090 | 6/1992 | Briatte | 340/953 |
| 5,161,874 | 11/1992 | Benes | 362/32 |
| 5,287,104 | 2/1994 | Shemwell | 340/953 |
| 5,436,806 | 7/1995 | Kato | 362/32 |

*Primary Examiner*—Brent A. Swarthout
*Attorney, Agent, or Firm*—Nilles & Nilles, S.C.

[57] ABSTRACT

Systems and methods for an integrated approach lighting system are described. An integrated approach lighting system includes a threshold bar and a plurality of lighting towers. The systems and methods provide advantages in that pilots are given a precise three dimensional visual reference to the aircraft's position relative to the runway's centerline, threshold crossing and height above the airfield. This provides the pilot with a higher concentration of visual information to insure faster decision making and an easier, more accurate and safe approach to landing.

48 Claims, 5 Drawing Sheets

INTEGRATED APPROACH LIGHTING SYSTEM AND METHOD OF USE THEREOF

This application is a continuation-in-part of U.S. application Ser. No. 08/636,798, filed Apr. 22, 1996 now U.S. Pat. No. 5,629,996, allowed Nov. 6, 1996, which is a continuation of U.S. application Ser. No. 08/564,596, filed Nov. 29, 1995, now abandoned.

BACKGROUND OF THE INVENTION

1. Field of the Invention

The present invention relates generally to the field of aircraft approach landing systems. More particularly, the present invention relates to visual aircraft approach landing systems. Specifically, a preferred embodiment of the present invention relates to an approach landing system that combines lateral and vertical aircraft position indicating functions that were previously performed by multiple discrete systems. The present invention thus relates to an approach lighting system of the type that can be termed integrated.

2. Discussion of the Related Art

Historically, an important factor in air traffic control is the interaction of humans with engineering systems. Particularly important are decision-making aids to assist pilots before and during landings.

Although the rapid advances in communication and computer technology have made the automation of many aircraft crew functions possible, the final portion of an airplane's flight is still based, at least in part, on information gained by the pilot through visual landing aids (VLA). A previously recognized problem has been that existing visual landing aids systems are relatively inefficient, large, heavy, expensive to install and difficult to maintain and repair during operation.

Among currently used visual landing aids systems, there are two major families. The precision approach lighting systems (PALS, ALSF, MALSR), and their modifications, provide visual information on the direction of the runway centerline. The visual approach slope indicator systems (VASIS, PAPI, APAPI, PLASI), and their modifications, provide visual information related to glide path angle. Although the function of both systems is to provide visual confirmation of an airplane's position with respect to the runway directly before landing, these systems are designed to work independently of each other. These systems have different patterns, different operating principles and different locations.

A previously recognized problem with these systems has been that the spatial separation of the locations of the two systems causes a critical drawback. Specifically, the pilot must simultaneously monitor the two disparate systems and make crucial decisions during the same limited time span in which he must also concentrate on all the other landing procedures. Heretofore, there has been no solution to this problem. Thus, the Federal Aviation Administration (FAA) has called for an alternative approach lighting system to replace the existing precision approach lighting and visual approach slope indicator systems.

What is needed therefore is a way to integrate the functions of these two systems into a single system. However, merely integrating these two systems electrically is not sufficient because the information provided by these two systems in their current form cannot be combined without maintaining spatial separation of the lights themselves. Therefore, what is also needed (and what has not heretofore been recognized) is an integrated solution that combines the functions of these two systems physically by increasing the density of visual information that is available to an approaching pilot.

Approach lighting systems, as well as other applications such as, for example, navigation lights, call for high efficiency illumination with precisely specified requirements. These requirements can include intensity distribution across the light pattern; light pattern shape; horizontal and vertical angular distribution of light; and light color. Applications that have specific requirements such as these are called high definition (HD) lighting.

Recent progress in developing efficient light sources and manufacturing optical fiber has enabled a new kind of illumination system in which an optical fiber is used to deliver light from an illuminator to remotely located points. This new illumination system is called remote source lighting (RSL). In such a system, the distal end of the optical fiber is used to provide the light distribution required by a given application. Typically, the open end of a plastic optical fiber produces a light cone having a solid angle of between 50° and 80°, depending on the core and cladding materials of the optical fiber. While conventional optics can be used to shape the light at the distal end of the optical fiber, problems of light loss and overly complicated lens designs have arisen. Heretofore, remote source lighting applications have been limited to areas where the combination of efficiency and precision are not required, ruling out the use of remote source light for airport approach lighting.

SUMMARY AND OBJECTS OF THE INVENTION

By way of summary, the present invention is directed to an integrated approach lighting system that includes threshold lights and approach lights. A primary object of the invention is to provide an apparatus that can be used as an integrated approach to airport approach lighting systems. Another object of the invention is to provide an apparatus that is cost effective both from an initial acquisition point of view and from a total life cycle point of view. It is another object of the invention to provide an apparatus that is rugged and reliable, thereby decreasing down time and operating costs. It is yet another object of the invention to provide an apparatus that enhances safety by removing electrical power from the approach path to and threshold of the runway environment.

In accordance with a first aspect of the invention, these objects are achieved by providing an integrated approach lighting system, comprising an illuminator; threshold lights which include a first luminaire optically connected to said illuminator, said first luminaire emitting a first color of light substantially in a first vertically orientated distribution of light; and a second luminaire optically connected to said illuminator, said second luminaire emitting said first color of light substantially in a second vertically orientated distribution of light, said first vertically orientated distribution of light and said second vertically orientated distribution of light (i) being horizontally angularly displaced with respect to each other and (ii) overlapping so as to define a first vertically orientated envelope.

The integrated approach landing system may also include a plurality of approaching lights leading up to the threshold, each of said plurality of approach lights including: a third luminaire optically connected to said illuminator, said third luminaire emitting a first horizontally orientated distribution of light; a fourth luminaire optically connected to said illuminator, said fourth luminaire emitting a second horizontally orientated distribution of light; said first horizontally orientated distribution of light and said second horizontally orientated distribution of light (i) being vertically angularly displaced with respect to each other and (ii) overlapping to define a first horizontally orientated envelope; and a fifth luminaire optically connected to said illuminator, said fifth luminaire emitting a circular distribution of light. In one embodiment, said first and second horizontally orientated distributions of light are each approximately 8° vertical by approximately 30° horizontal, and said circular distribution of light is approximately 3° circular.

Another object of the invention is to provide a method that can be used to operate an integrated approach lighting system at an airport. It is another object of the invention to provide a method that is predictable and reproducible, thereby decreasing variance and operating costs while simultaneously enhancing safety. It is yet another object of the invention to provide a method that has one or more of the characteristics discussed above but which is relatively simple to set up and operate using moderately skilled workers.

In accordance with a second aspect of the invention, these objects are achieved by providing a method of guiding an aircraft on approach to a runway threshold, said runway having an extended centerline and said approach having a nominal glide path, said method comprising the steps of: emitting from near said runway threshold a first color of light substantially in a first vertically orientated distribution of light on one side of and adjacent to said extended centerline; emitting from near said runway threshold said first color of light substantially in a second vertically orientated distribution of light on the other side of and adjacent to said extended centerline; said first vertically orientated distribution of light and said second vertically orientated distribution of light overlapping each other so as to define a first vertically orientated envelope centered on said extended centerline and in which both said first and said second vertically orientated distributions of light are visible to said aircraft on said extended centerline.

These objects may also be achieved by also emitting a second color of light substantially in a first horizontally orientated distribution of light above and adjacent to said nominal glide path; emitting a third color of light substantially in a second horizontally orientated distribution of light below and adjacent to said nominal glide path; said first horizontally orientated distribution of light and said second horizontally orientated distribution of light overlapping each other to define a first horizontally orientated envelope centered on said nominal glide path and in which both said first and said second horizontally orientated distributions of light are visible to said aircraft on said nominal glide path; and emitting a fourth color of light substantially circular distribution of light in which said cone of light is visible to said aircraft on said centerline and on said nominal glide path.

Other advantages and objects of the invention will be apparent from the description of the preferred embodiments below.

DESCRIPTION OF PREFERRED EMBODIMENTS

Figure 1:
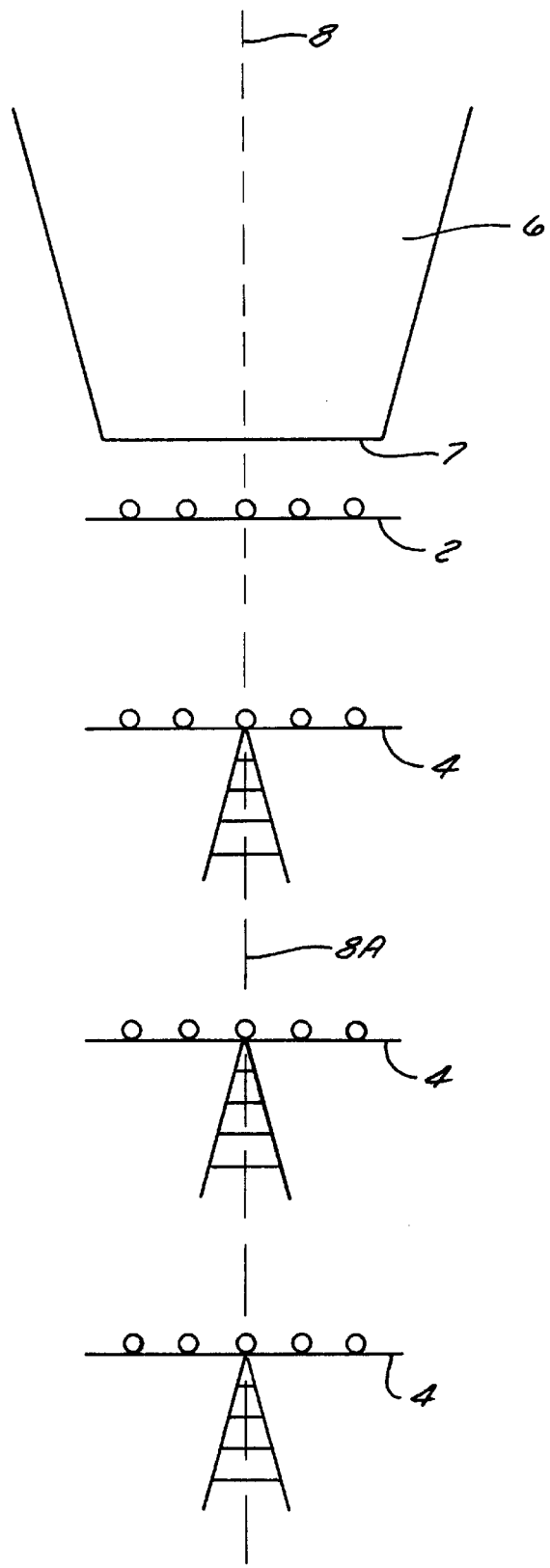
FIG. 1 illustrates an approach to a runway having a threshold lighting bar and approach lighting towers.

Referring now to FIG. 1, the integrated approach lighting system may preferably comprise a threshold lighting bar 2 and series of lighting towers 4 spaced along an approach path to a runway 6 having a threshold 7, centerline 8, and extended centerline 8A. Threshold lighting 2 may be located at or near the threshold 7 of runway 6 on the ground level and therefore may be termed a threshold lighting bar. Lighting towers 4 are spaced at intervals leading up to the threshold 7 and may be termed approach lighting towers.

Figure 2:
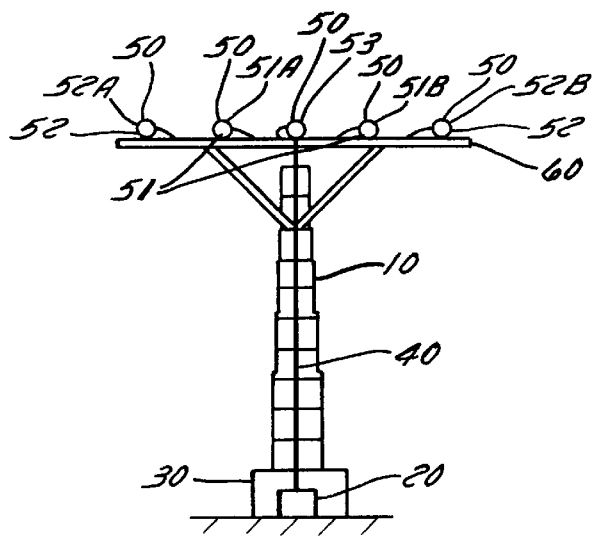
FIG. 2 illustrates an elevational view of an integrated approach lighting tower according to the present invention.

Referring now to FIG. 2, an approach lighting tower 10 in accordance with the present invention is depicted. Referring to approach lighting tower 10, an illuminator 20 is located within the base 30 of tower 10. Light from illuminator 20 travels upward through tower 10 via optical fibers 40. The distal ends of optical fibers 40 are connected to luminaires 50. Luminaires 50 are mechanically connected to light bar 60. Five luminaires are depicted, although light bar 60 can be fitted with any number of luminaires, the number of luminaires not being critical. In the preferred embodiment of the present invention, approach lighting towers may have three or more luminaires, and preferably five as discussed below.

Still referring to FIG. 2, the five luminaires 50 on approach lighting tower 10 can be grouped into three sets. A first set 51 includes two redundant luminaires 51A and 51B at inner positions of the light bar 60. A second set 52 includes two redundant luminaires 52A and 52B at the outer positions of the light bar 60. Finally, a third set 53 includes a single luminaire in the center of light bar 60. The first and second sets need not each have two luminaires but any desired number, such as one luminaire, or more, each.

Figure 3:
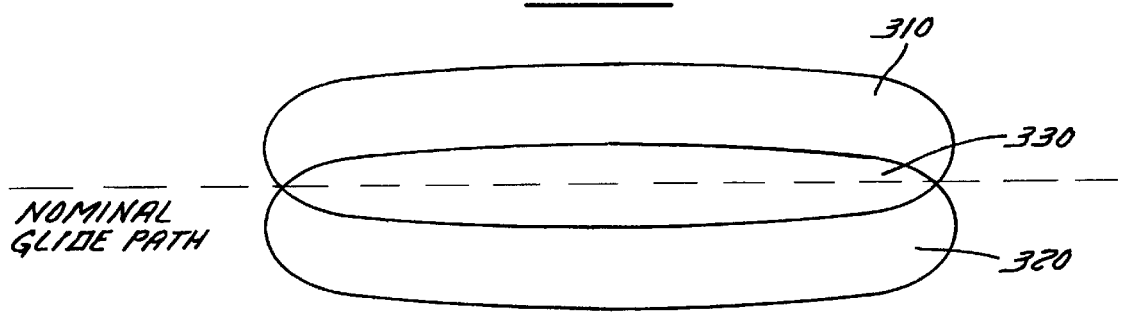
FIG. 3 illustrates a cross-sectional view of a first horizontally oriented distribution of light and second horizontally orientated distribution of light overlapping each other along the plane extending horizontally from the nominal glide path on an approach to a runway.

Referring to both FIGS. 2 and 3, the first set 51 and second set 52 of luminaires in FIG. 1 may be designed to emit any desired distribution of light in any shape such as elliptical, square, circular, etc. The lighting pattern shown in FIG. 3 is one example (elliptical) and thereby conveys positional information to an approaching pilot. As seen in FIG. 3, the first set of luminaires 51 emits a first horizontally orientated distribution of light 310 that is elliptical and positioned above and adjacent the nominal glide path. The major axis of the distribution of light 310 is horizontal and the minor axis vertical. The second set of luminaires 52 emits light in a second horizontally orientated distribution of light 320 that is also elliptical and positioned below and adjacent the nominal glide path. The major and minor axes of distribution of light 320 are orientated as those of distribution of light 310.

Referring now to just FIG. 3, the distribution of light 310 above and adjacent the nominal glide path is preferably approximately 8° vertical by 30° horizontal and distribution of light 320 below and adjacent the nominal glide path similarly is approximately 8° vertical by 30° horizontal. Further, the first horizontally orientated distribution of light 310 may overlap with the second horizontally orientated distribution of light 320 to define a first horizontally orientated envelope 330 by a fraction of a degree to several degrees, or more, which preferably is centered on the nominal glide path.

The pilot of an approaching aircraft will perceive light from both the first and second horizontally orientated distributions of light 310 and 320 only when the approaching aircraft is within the first horizontally orientated envelope 330, i.e., on the nominal glide path. If the approaching aircraft is below the nominal glide path the pilot will perceive light only from distribution of light 320. If above the nominal glide path, the pilot will perceive light only from distribution of light 310.

Figure 4:
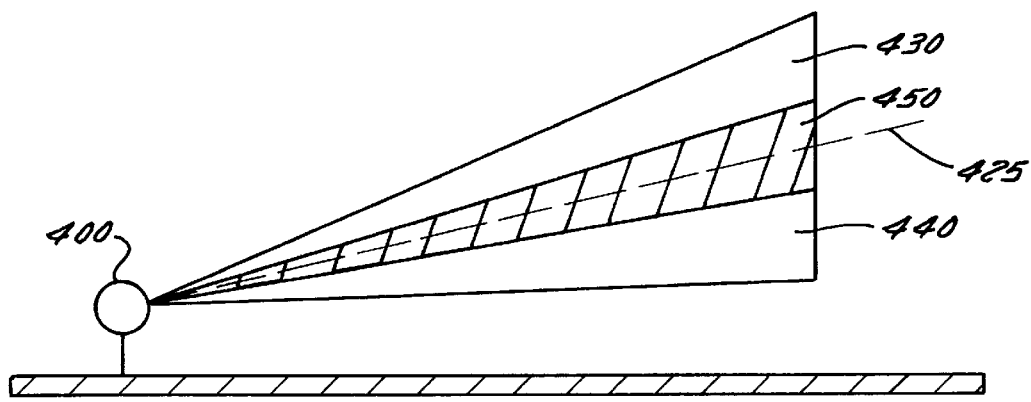
FIG. 4 illustrates an elevational side view of an integrated approach lighting system according to the present invention.

Referring now to FIG. 4, a schematic side view of the lights emitted from an approach lighting tower of the present invention as in FIG. 2 and FIG. 3 is depicted. From FIG. 4, it will be appreciated that the first horizontally orientated distribution of light 310 and the second horizontally orientated distribution of light 320 are angularly displaced with respect to each other, and that the angle of displacement is vertically oriented. An approach lighting tower in FIG. 4 is designated 400 and emits beams 430 above and adjacent nominal glide path 425 (upper) and 440 below and adjacent nominal glide path 425 (lower) which overlap in area 450 which is centered on the nominal glide path 425. As seen from an approaching aircraft on the nominal glide path 425, the beams may appear as in FIG. 3. Beam 430 in FIG. 4 may correspond to distribution of light 310 in FIG. 3 and is situated above and adjacent the nominal glide path 425. Beam 440 of FIG. 4 may correspond to distribution of light 320 of FIG. 3 and is situated below and adjacent the nominal glide path 425. The overlapping area 450 of FIG. 4 may correspond to envelope 330 of FIG. 3 which is centered on or encompasses the nominal glide path 425.

The pilot of an approaching aircraft above the nominal glide path 425 will perceive light only from beam 430 which may be generated by the first set of luminaires 51 as shown in FIG. 2 which emit light in a first horizontally orientated distribution of light 310 as shown in FIG. 3. The pilot of an approaching aircraft below the nominal glide path 425 will perceive light only from beam 440 which is generated by the second set of luminaires 52 as shown in FIG. 2 which emit light in a second horizontally orientated distribution of light 320 as shown in FIG. 3. The pilot of an approaching aircraft which is on the nominal glide path 425 will perceive light from both beams 430 and 440 which are generated by both sets of luminaires 51 and 52 and which overlap to form envelope 330 centered on the nominal glide path 425 as shown in FIG. 3.

Figure 5:
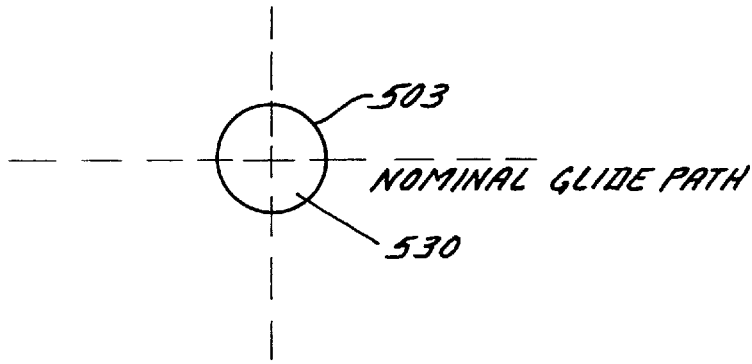
FIG. 5 illustrates a schematic view of a fourth color of a circular distribution of light according to the present invention.

Referring again to FIG. 2, the third set of luminaires 53 on approach lighting tower 10 includes a single central luminaire, but may include other, redundant luminaires. Referring to both FIGS. 2 and 5, the third set of luminaires 53 in FIG. 2 will emit any desired distribution of light. A simple circular distribution of light at the intersection of the nominal glide path and extended runway centerline is shown in FIG. 5. The circular distribution of light thereby conveys additional positional information to an approaching pilot preferably simultaneously with the positional information shown in FIG. 3 from the first and second sets of luminaires 51, 52 on lighting tower 10. The circular distribution of light preferably has a distribution of 1–10°, and preferably approximately 3°.

Figure 6:
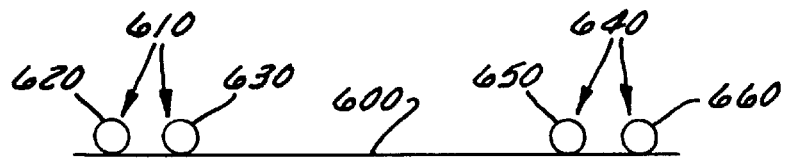
FIG. 6 illustrates a schematic view of an integrated threshold lighting bar according to the present invention.

Referring now to FIG. 6, a threshold lighting bar is shown. The threshold lighting bar is typically situated at the runway threshold and includes a threshold bar 600 and a first set of luminaires 610 on the left having redundant luminaires 620 and 630 and a second set of luminaires 640 on the right having redundant luminaires 650 and 660. Although each set is shown and described as having two luminaires, one or more than one luminaire in each set is permissible. The primary purpose of the threshold bar 600, positioned at the runway threshold, is to indicate to the pilot both the heading of his approaching aircraft with regard to the runway and the beginning of the runway.

Figure 7:
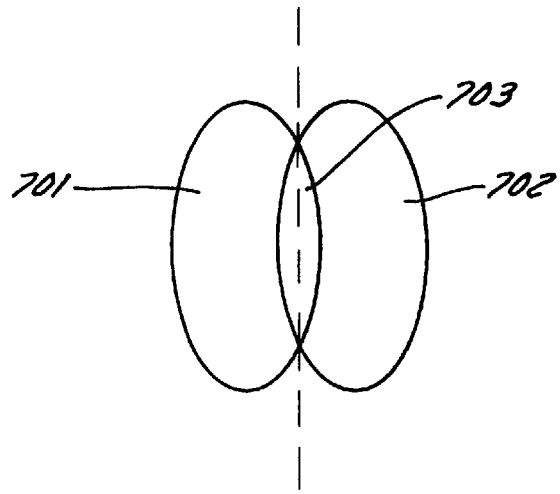
FIG. 7 illustrates a cross-sectional view of a first vertically orientated distribution of light and second vertically orientated distribution of light half overlapping each other along the plane extending vertically from the extended centerline of a runway.

Referring now to FIGS. 6 and 7, the left set of luminaires 610 on the threshold bar 600 may be designed to emit any desired distribution of light, elliptical, square, circular, etc. The first set of luminaires 610 may emit a first vertically orientated distribution of light 701. Distribution of light 701 is emitted along the left side of and adjacent the extended runway centerline. The right set of luminaires 640 on the threshold bar 600 may be designed to emit any desired distribution of light. Luminaires 640 may emit a second vertically orientated distribution of light 702. Distribution of light 702 is emitted along the right side of and adjacent the extended runway centerline. The first vertically orientated distribution of light 701 and the second vertically orientated distribution of light segment 702 overlap to define a first vertically orientated envelope 703 which is centered on or encompasses the extended runway centerline. It will be appreciated that the first vertically orientated distribution of light 701 and the second vertically orientated distribution of light 702 are angularly displaced with respect to each other, and that the angle of displacement is horizontally oriented.

The pilot of an approaching plane will perceive light from the left set of luminaires 610 that generate the first vertically orientated distribution of light 701 and the right set of luminaires that generate the second vertically orientated distribution of light 702 only when the aircraft is on the extended centerline, i.e., if left of center, the pilot will perceive only distribution of light 701, while if right of center the pilot will perceive only distribution of light 702.

It can be seen therefore that a pilot on an approach to a runway 6 having a threshold lighting bar 2 and approach lighting towers 4 made in accordance with the present invention will have the benefit of the integrated light signals shown in FIGS. 3, 5, and 7 and therefore will have available to him a heretofore unequaled density and quality of guidance information.

Figure 8A:
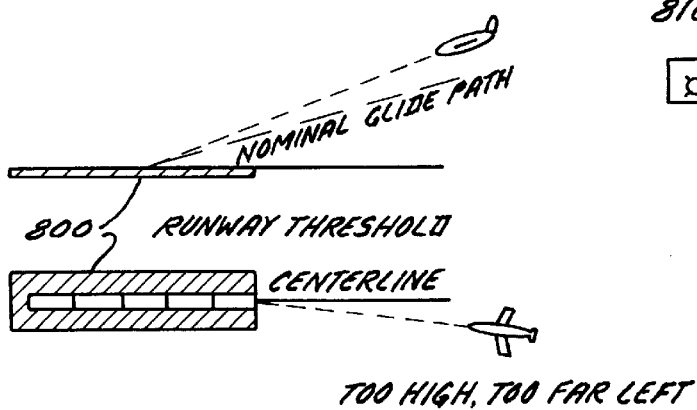
FIGS. 8A–8B illustrate the position and light pattern visible from an airplane that is too high and too far left according to the present invention.

Referring now to FIG. 8A, an approaching aircraft is depicted in a position relative to the runway 800 that is too high (i.e., above the nominal glide path) and too far to the left (i.e., left of the extended centerline). Referring now to FIGS. 8A–8F, a threshold bar 809 is depicted having a left set of luminaires 810 and a right set of luminaires 811 and multiple approach lighting towers 820 each having a first set 812, a second set 813, and a third set 814 of luminaires as shown. The first set 812 of luminaires on approach lighting towers 820 emits a color such as amber in a first horizontally orientated distribution of light along and adjacent the nominal glide path. This distribution of light may correspond to distribution of light 310 in FIG. 3. The second set of luminaires 813 emits a color such as red in a horizontally orientated distribution of light and below and adjacent the nominal glide path which overlaps with the first distribution of light. The second horizontally orientated distribution of light may correspond to distribution of light 320 in FIG. 3. The third set of luminaires 814 emits a circular distribution of white light circumscribing, centered on, or surrounding the intersection of the nominal glide path and extended center line of the runway 800. This circular distribution of light may correspond to circular distribution of light 503 in FIG. 5.

Figure 8B:
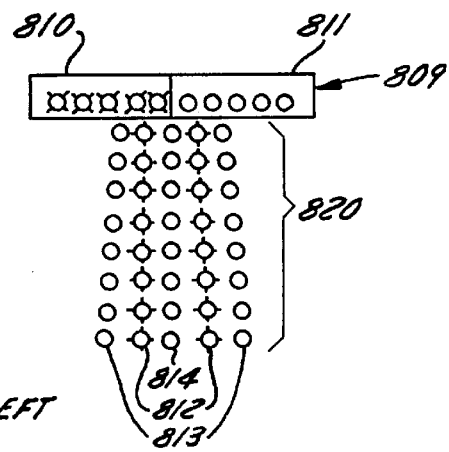

Referring now to just FIGS. 8A and 8B, the pilot of the approaching aircraft which is high and left will perceive light (green) from only the left set 810 of luminaires on the left side of the threshold bar 809. This light may have a distribution corresponding to distribution of light 701 in FIG. 7. Further, the pilot of such an aircraft will perceive light (amber) from only the set of luminaires 812 on the plurality of lighting towers 820 that emit light above and adjacent the nominal glide path. The pilot of the approaching aircraft who sees this knows that he is above the nominal glide path and left of the extended centerline.

Figure 8E:
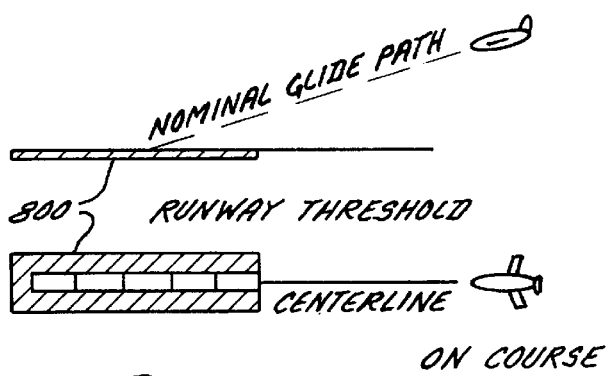
FIGS. 8E–8F illustrate the position and light pattern visible from an airplane that is on course according to the present invention.
Figure 8F:
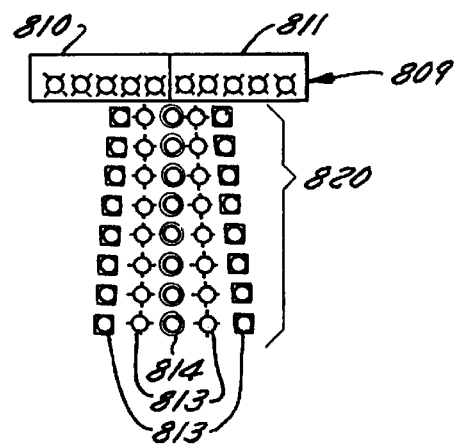
Figure 8C:
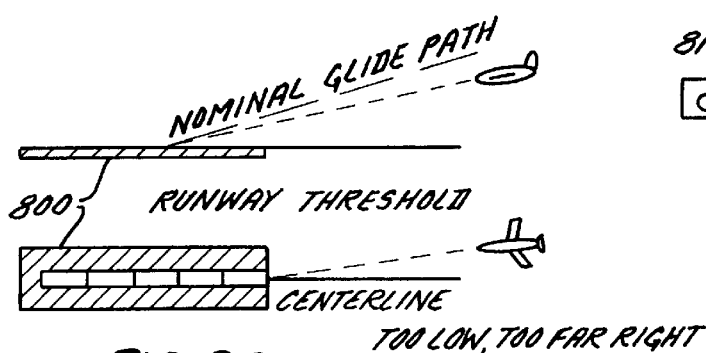
FIGS. 8C–8D illustrate the position and light pattern visible from an airplane that is too low and too far right according to the present invention.
Figure 8D:
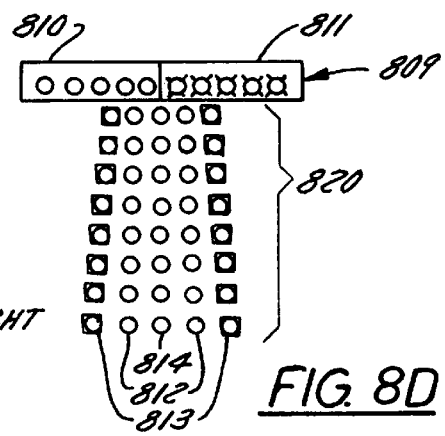

Referring now to FIG. 8C, an aircraft is depicted in a position that is too low and too far right with regard to runway 800. Referring to FIG. 8D, the pilot of such an aircraft will perceive light (green) from only the right set of luminaires 811 on the right half of threshold bar 809. This light may have a distribution corresponding to distribution of light 702 in FIG. 7. Further, the pilot of such an aircraft will perceive light (red) from only the set of luminaires 813 on the plurality of lighting towers 820 that emit light below and adjacent the nominal glide path. The pilot will thus know that he is below the nominal glide path and right of extended centerline.

Referring now to FIG. 8E, the position of an aircraft that is on course and on glide path with regard to runway 800 is depicted. Referring now to FIG. 8F, the pilot of such an aircraft will perceive light (green) emitted from both sets 810 and 811 (right and left) of luminaires of threshold bar 809 which overlap in a vertical envelope centered on the extended runway centerline. This overlapping envelope may have a shape and orientation corresponding to envelope 703 in FIG. 7. Further, the pilot of such an aircraft will perceive light emitted from all three sets 812, 813, and 814 of the luminaires composing the plurality of lighting towers 820. Therefore, the pilot will be able to observe the white circular distribution of light emitted from the third set of luminaires 814 on each of the plurality of towers 820 as well as the distributions of light from sets 812 and 813 which overlap in a horizontally orientated envelope centered on the nominal glide path.

Therefore, the approach lighting system of the present invention integrates for the benefit of an aircraft on an approach to the runway lateral guidance information from sets 810 and 811 of green lights and glide path information from sets 812 and 813 of amber and red lights respectively, in conjunction with set 814 of white lights which confirm that the approaching aircraft is both on the extended centerline and on the nominal glide path.

Figure 9:
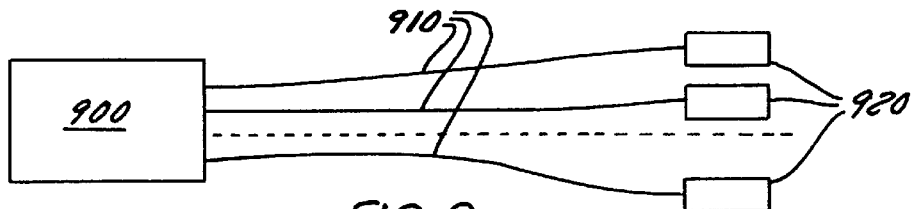
FIG. 9 illustrates a schematic view of remote source lighting according to the present invention.

Referring now to FIG. 9, the remote source lighting system hardware preferably consists of three main subsystems. The first subsystem is an illuminator 900, in which light is generated and collected into a small spot. The second subsystem is a plurality of optical fibers 910 (usually large diameter plastic optical fibers, or light pipes) which deliver light from the illuminator to remotely located lighting points. The third subsystem is a plurality of luminaires 920 (distal end devices) that provide the desired distributions of light from the various luminaires of the present invention and color the outgoing light. Allowed U.S. Pat. No. 5,629,996, upon which priority is claimed, discloses preferred illuminators, fibers, and luminaires and remote lighting systems thereof. Some of the subject matter of U.S. Pat. No. 5,629,996 is briefly repeated below, and the remainder of the subject matter of U.S. Pat. No. 5,629,996 which is not repeated below is hereby expressly incorporated by reference.

Still referring to FIG. 9, the illuminator 900 provides optical power for one or more luminaires 920 of the integrated approach lighting system. Optical fibers 910 are optically coupled to illuminator 900. Luminaires 920 are in turn optically connected to optical fibers 910. Thus, light from illuminator 900 is conducted to luminaires 920.

Figure 10:
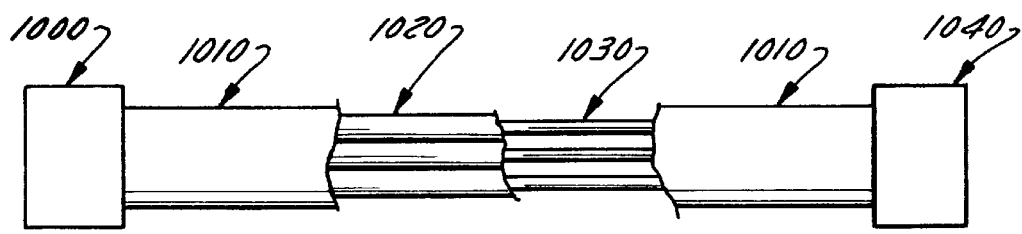
FIG. 10 illustrates a schematic view of optical cable according to the present invention.

The preferred connection between the illuminator 900 and the luminaires 920 will be better appreciated through a detailed consideration of the optical coupling as shown in FIG. 10. FIG. 10 shows an optical cable designed for use in remote source lighting applications. Connector 1000 is connected to the illuminator (not shown). Cabling 1010 includes jacketing 1020 and plastic optical fibers 1030. Cabling 1010 is mechanically and optically connected to connector 1000. Plastic optical fibers 1030 can be light pipes, waveguides, or any equivalent structure. Cabling 1010 is also connected to connector 1040, thereby completing the connection between the illuminator and the luminaires.

Figure 11:
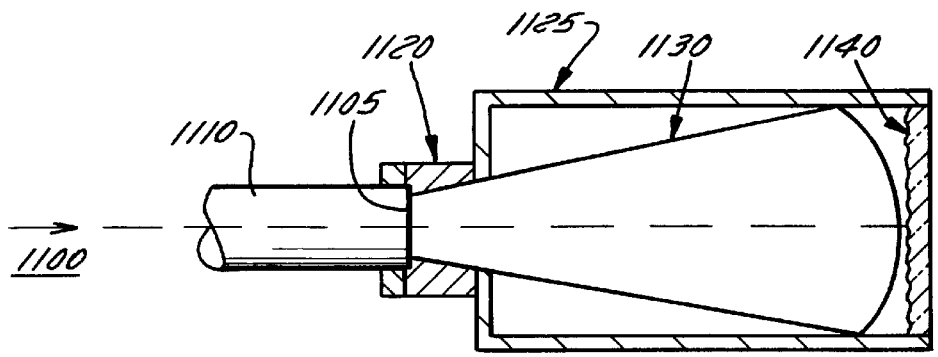
FIG. 11 illustrates a schematic view of a luminaire according to the present invention.

Referring now to FIG. 11, the construction of the preferred luminaires 920 of FIG. 9 will be better appreciated by consideration of the apparatus therein. In FIG. 11, light 1100 from the illuminator (not shown) is conducted through an optical fiber 1110. Optical fiber 1110 is optically and mechanically connected to an optical connector 1120. Optical connector 1120 is mechanically connected to an enclosure 1125.

Still referring to FIG. 11, a nonimaging light transformer 1130 is located within enclosure 1125. Further, nonimaging light transformer 1130 is optically coupled to optical connector 1120. The input 1105 of nonimaging light transformer 1130 has a diameter which matches the output diameter of the fiber 1110. The function of the transformer 1130 is to reduce, with minimum losses, the divergence angle of the light emerging from the optical fiber to the value that is appropriate for optimal performance of the diffuser.

A non-Lambertian holographic diffuser 1140 is located within enclosure 1125. This diffuser can be a surface diffuser that is replicated from a topography that is generated by speckle recorded in a developed photosensitive material.

Diffuser 1140 can produce light outputs of various shapes dependent upon the manner in which it is recorded. U.S. Pat. No. 5,534,386 describes such recording techniques and is hereby incorporated by reference. Non-Lambertian holographic diffuser 1140 can be an integral part of non-imaging light transformer 1130 or, alternatively be a separate discrete part as shown.

Still referring to FIG. 11, the light transformer/holographic diffuser combination permits a wide range of illumination patterns from an approximately 100° angle (for general illumination) to an approximately 1° angle, or less (for an intense spotlight). It should be appreciated that the desired illumination patterns of the luminaires will vary from installation to installation depending upon many factors such as ICAO regulators, airport layout, obstructions, environmental limitations, and aircraft limitations. Multiple diffusers can be combined to produce two different overlapping patterns, resulting in an elliptical, linear, or even square illumination pattern. Light coloring is possible simply by using a colored filter as the diffuser substrate. Allowed U.S. Pat. No. 5,629,996, incorporated above, may be referred to for a detailed discussion of the above components which are effective to produce desired distributions of light in accordance with the present invention.

Figure 12:
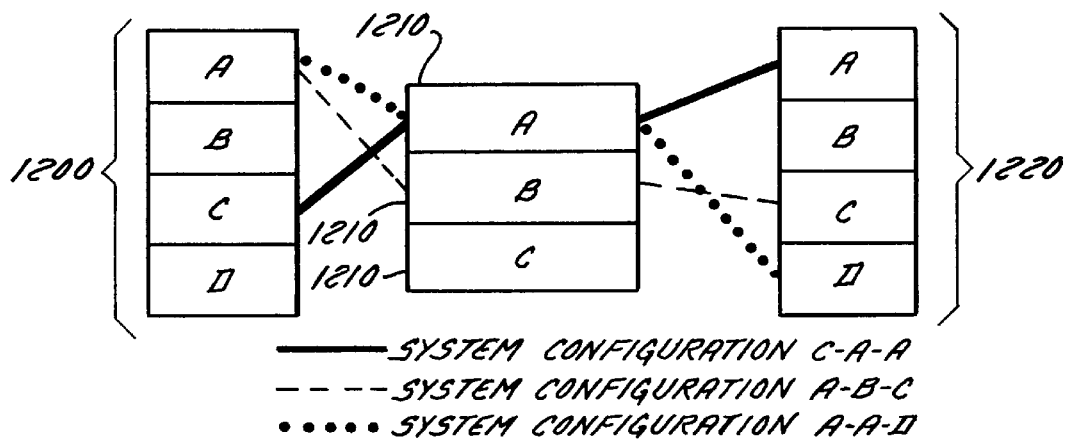
FIG. 12 illustrates a schematic view of multiple designs based on a modular approach to combining components according to the present invention.

Referring now to FIG. 12, a plurality of illuminators 1200 is indicated by a plurality of boxes labeled A–D. Illuminators 1200 can be connected to optical cable 1210 in any possible configuration through the use of a fiber optic coupler splitter. A plurality of optical cables 1210 is indicated by boxes labeled A–C. Optical cables 1210 can be connected to luminaires 1220 in any possible configuration through the use of a fiber optic coupler splitter. A plurality of luminaires 1220 is indicated by boxes labeled A–D. The thick dark line indicates a system configuration C-A-A whereby light from illuminator C is conducted through optical cable A to luminaire A. Similarly, the dashed line indicates a system configuration A-B-C wherein light from illuminator A is connected by optical cable B to luminaire C. Similarly, the dotted line indicates a system configuration A-A-D whereby light from illuminator A is conducted via optical cable A to luminaire D. Although the depicted configurations show a 1—1 correspondence for each of the three modules, optical merging and splitting can be effected between any two of the modules. In this way, one illuminator can power more than one optical cable. Conversely, a plurality of illuminators 1200A–D can power a single optical cable 1210. With regard to the connection between the optical cables 1210 and the luminaires 1220, one optical cable can power more than one luminaire. A corollary is that a multiplicity of optical cables 1210 can be used to power a single luminaire 1220.

The invention offers particular advantages to airport approach lighting in that the luminaires provide HD lighting, do not corrode, need not be changed, can be easily maintained, and present no shock or fire hazard to workers, ground vehicles or aircraft. At the same time, the inventive integrated approach lighting system (IALS) apparatus is safer since the structures needed to support the lighter remote source lighting fixtures would present less mass, and no fire or electrical, hazard to vehicles or aircraft. Safety is further enhanced by supplying the pilots with more concentrated visual information to ensure safe landings and rapid decision making.

Power savings are also expected to be a competitive advantage of the IALS. Since light is provided exactly and only in the desired pattern (no shutters are used to block light form shining in undesired directions), power usage could decrease by a tenth, resulting in considerable monetary savings to the airport. Further, when operating the system, it can be advantageous to lower the intensity of illumination as an approaching plane nears the threshold bar. This helps the pilot see the actual runway surface more clearly and reduces power consumption, thereby further enhancing efficiency.

It will be manifest that various additions, modifications and rearrangements of the features of the present invention may be made without deviating from the spirit and scope of the underlying inventive concept.

What is claimed is:

1. An integrated approach lighting system, comprising:
   an illuminator;
   threshold lights, said threshold lights including:
      a first luminaire optically connected to said illuminator, said first luminaire emitting a first vertically orientated distribution of light; and
      a second luminaire optically connected to said illuminator, said second luminaire emitting a second vertically orientated distribution of light,
      said first vertically orientated distribution of light and said second vertically orientated distribution of light (i) being horizontally angularly displaced with respect to each other and (ii) overlapping so as to define a first vertically orientated envelope in which each distribution of light is mutually and distinctly visible;
   approach lights, said approach lights including:
      a third luminaire optically connected to said illuminator, said third luminaire emitting a first horizontally orientated distribution of light;
      a fourth luminaire optically connected to said illuminator, said fourth luminaire emitting a second horizontally orientated distribution of light;
      said first horizontally orientated distribution of light and said second horizontally orientated distribution of light (i) being vertically angularly displaced with respect to each other and (ii) overlapping to define a first horizontally orientated envelope in which each distribution of light is mutually and distinctly visible; and
      a fifth luminaire optically connected to said illuminator, said fifth luminaire emitting a circular distribution of light.

2. The integrated approach lighting system of claim 1, wherein said first, second, third, and fourth luminaires each comprise a plurality of luminaires.

3. The integrated approach lighting system of claim 1, wherein said first horizontally orientated distribution of light is approximately 8° vertical by approximately 30° horizontal.

4. The integrated approach lighting system of claim 3, wherein said second horizontally orientated distribution of light is approximately 8° vertical by approximately 30° horizontal.

5. The integrated approach lighting system of claim 1, wherein said circular distribution of light is approximately 3° circular.

6. The integrated approach lighting system of claim 1, wherein said first and second luminaires emit green light.

7. The integrated approach lighting system of claim 1, wherein said third luminaire emits amber light and said fourth luminaire emits red light.

8. The integrated approach lighting system of claim 1, wherein said fifth luminaire emits white light.

9. The integrated approach lighting system of claim 1 wherein said luminaires comprise a non-imaging light transformer coupled to a non-Lambertian holographic diffuser.

10. An approach lighting system for aircraft for a runway having an extended centerline, said lighting system comprising:

an illuminator that generates light energy;

a first stationary luminaire optically connected to said illuminator to receive at least a portion of the light energy, said first luminaire including a diffuser for shaping the light energy received so as to emit a first vertically orientated high density distribution of light of a particular geometric shape on one side of and adjacent said extended centerline; and a second stationary luminaire optically connected to said illuminator to receive at least another portion of the light energy, said second luminaire including a diffuser shaping the light energy received so as to emit a second vertically orientated highly density distribution of light of a particular geometric shape on the other side of and adjacent said extended centerline, said first vertically orientated distribution of light and said second vertically orientated distribution of light overlapping so as to define a first vertically orientated envelope in which each distribution of light is mutually and distinctly visible by an aircraft located in said envelope, said envelope centered on said extended runway centerline.

11. The approach lighting system of claim 10, wherein said first and second luminaires emit green light.

12. The approach lighting system of claim 10, wherein said first and second luminaires each comprise a plurality of luminaires.

13. The approach lighting system for a runway having an extended centerline of claim 10 further comprising said luminaires comprise a non-imaging light transformer coupled to a non-Lambertian holographic diffuser.

14. The approach lighting system of claim 10, wherein said first and second vertically orientated distributions of light have a generally elliptical shape such that each has a major and a minor axis.

15. An approach lighting system for an approach to a runway having an extended centerline, said approach having a nominal glide path, said lighting system comprising:

an illuminator that generates light energy;

a first stationary luminaire optically connected to said illuminator to receive at least a portion of the light energy, said first luminaire including a diffuser for shaping the light energy received so as to emit a first horizontally orientated high density distribution of light of a particular geometric shape above and adjacent said nominal glide path; and a second stationary luminaire optically connected to said illuminator to receive another portion of the light energy, said second luminaire including a diffuser for shaping the light energy received so as to emit a second horizontally orientated high density distribution of light below and adjacent said nominal glide path;

said first horizontally orientated distribution of light and said second horizontally orientated distribution of light overlapping to define a first horizontally orientated envelope in which each distribution of light is mutually and distinctly visible by an aircraft located in said envelope, said envelope centered on said nominal glide path.

16. The approach lighting system of claim 15, further comprising a third luminaire optically connected to said illuminator, said third luminaire emitting a circular distribution of light centered on said nominal glide path and said extended centerline.

17. The approach lighting system of claim 15, wherein said first horizontally orientated distribution of light is approximately 8° vertical by approximately 30° horizontal.

18. The approach lighting system of claim 17, wherein said second horizontally orientated distribution of light is approximately 8° vertical by approximately 30° horizontal.

19. The approach lighting system of claim 16, wherein said circular distribution of light is approximately 3° circular.

20. The approach lighting system of claim 15, wherein said first luminaire emits amber light.

21. The approach lighting system of claim 15, wherein said second luminaire emits red light.

22. The approach lighting system of claim 16, wherein said third luminaire emits white light.

23. The integrated approach lighting system of claim 15 wherein said luminaires comprise a non-imaging light transformer coupled to a non-Lambertian holographic diffuser.

24. The approach lighting system of claim 15, wherein said first and second horizontally orientated distributions of light have a generally elliptical shape such that each has a major and a minor axis.

25. A method of guiding an aircraft on approach to a runway, said runway having a threshold and an extended centerline and said approach having a nominal glide path, said method comprising the steps of:

emitting from near said runway threshold a first vertically orientated distribution of light;

emitting from near said runway threshold a second vertically orientated distribution of light;

said first vertically orientated distribution of light and said second vertically orientated distribution of light (i) being horizontally angularly displaced with respect to each other and (ii) overlapping so as to define a first vertically orientated envelope in which both said first and said second vertically orientated distributions of light are visible to an aircraft on said extended centerline;

emitting a first horizontally orientated distribution of light;

emitting a second horizontally orientated distribution of light, said first horizontally orientated distribution of light and said second horizontally orientated distribution of light (i) being vertically angularly displaced with respect to each other and (ii) overlapping to define a first horizontally orientated envelope in which both said first and said second horizontally orientated distributions of light are visible to an aircraft on said nominal glide path; and emitting a circular distribution of light which is visible to an aircraft on said extended centerline and on said nominal glide path.

26. The method of claim 25, wherein said circular distribution of light is not visible when an aircraft is not on said centerline or not on said nominal glide path.

27. The method of claim 25, wherein both said first and second horizontally orientated distributions of light are visible simultaneously only when said aircraft is on said nominal glide path.

28. A method of guiding an aircraft on approach to a runway, said runway having a threshold and an extended centerline and said approach having a nominal glide path, said method comprising the steps of:

emitting from near said runway threshold a first vertically orientated distribution of light;

emitting from near said runway threshold a second vertically orientated distribution of light;

said first vertically orientated distribution of light and said second vertically orientated distribution of light (i) being horizontally angularly displaced with respect to each other and (ii) overlapping so as to define a first vertically orientated envelope in which both said first and said second vertically orientated distributions of light are visible to an aircraft on said extended centerline;

emitting a first horizontally orientated distribution of light;

emitting a second horizontally orientated distribution of light, said first horizontally orientated distribution of light and said second horizontally orientated distribution of light (i) being vertically angularly displaced with respect to each other and (ii) overlapping to define a first horizontally orientated envelope in which both said first and said second horizontally orientated distributions of light are visible to an aircraft on said nominal glide path; and emitting a circular distribution of light which is visible to an aircraft on said extended centerline and on said nominal glide path;

wherein only one of said first and second vertically orientated distributions of light is visible when an aircraft is not on said extended centerline.

29. A method of guiding an aircraft on approach to a runway, said runway having a threshold and an extended centerline, said method comprising the steps of:

providing first and second stationary luminaires;

generating light energy with an illuminator;

shaping, with said first luminaire and a diffuser and from near said runway threshold, a portion of the light of a particular geometric shape energy so as to emit a first vertically orientated high density distribution of light of a particular geometric shape along and adjacent one side of said extended centerline;

shaping, with said second luminaire and a diffuser and from near said runway threshold, another portion of the light energy so as to emit a second vertically orientated high density distribution of light on the other side of and adjacent said extended centerline;

said first vertically orientated distribution of light and said second vertically orientated distribution of light overlapping each other so as to define a first vertically orientated envelope centered on said extended centerline and in which both said first and second vertically orientated distributions of light are mutually and distinctly visible to an aircraft in said envelope on said extended centerline.

30. The method as defined in claim 29, wherein said first and second vertically orientated distributions of light are green light.

31. The method of claim 29, further comprising the step of transmitting at least a portion of the light energy to each of said first and second luminaires via independent and corresponding fiber optic cables, each said cable having an input end and a distal output end coupled to a corresponding one of said first and second luminaires.

32. The method of claim 31, further comprising the step of, shaping the light energy with each of said first and second luminaires.

33. The method of claim 32, wherein said shaping step includes using a non-lambertian holographic diffuser.

34. The method of claim 31, wherein each of said first and second vertically orientated distributions of light has a vertical range approximately equal to 1° to 100°.

35. The method of claim 29, wherein said first and second vertically orientated distributions of light have a generally elliptical shape and each has a major axis and a minor axis.

36. The method of claim 29,
wherein only one of said first and second vertically orientated distributions of light is visible when an aircraft is not on said extended centerline.

37. A method of guiding an aircraft on approach to a runway, said runway having an extended centerline and said approach having a nominal glide path, said method comprising the steps of:

providing first and second stationary luminaires, and an illuminator to supply light energy to said first and second luminaires;

shaping, with said first luminaire and a diffuser, a portion of the light energy so as to emit a first horizontally orientated high density distribution of light of a particular geometric shape above and adjacent said nominal glide path;

shaping, with said second luminaire diffuser, another portion of the light energy so as to emit a second horizontally orientated high density distribution of light of a particular geometric shape below and adjacent said nominal glide path;

said first and second horizontally orientated distributions of light overlapping each other to define a first horizontally orientated envelope centered on said nominal glide path and in which both said first and second horizontally orientated distributions of light are mutually and distinctly visible to an aircraft in said envelope on said nominal glide path.

38. The method as defined in claim 37, further comprising the steps of:

emitting a circular distribution of light along said extended centerline and said nominal glide path which is visible to an aircraft on said extended centerline and on said nominal glide path.

39. The method as defined in claim 37, wherein said circular distribution of light is not visible to an aircraft not on said extended centerline or on said nominal glide path.

40. The method of claim 37, further comprising the step of transmitting at least a portion of the light energy to each of said first and second luminaires via independent and corresponding fiber optic cables, each said cable having an input end and a distal output end coupled to a corresponding one of said first and second luminaires.

41. The method of claim 40, further comprising the step of, shaping the light energy with each of said first and second luminaires.

42. The method of claim 41, wherein said shaping step includes using a non-lambertian holographic diffuser.

43. The method of claim 40, wherein each of said first and second horizontally orientated distributions of light has a horizontal range approximately equal to 1° to 100°.

44. The method of claim 37, wherein said first and second horizontally orientated distributions of light are generally elliptically shaped and include a major axis and a minor axis.

45. An integrated approach lighting system, comprising:

at least one illuminator;

threshold lights, said threshold lights including:

a first luminaire optically connected to said at least one illuminator, said first luminaire emitting a first distinct vertically orientated distribution of light; and a second luminaire optically connected to said at least one illuminator, said second luminaire emitting a second distinct vertically orientated distribution of light, said first distinct vertically orientated distribution of light and said second distinct vertically orientated distribution of light (i) being horizontally angularly displaced with respect to each other and (ii) overlapping so as to define a first distinct vertically orientated envelope of mutual and distinct visibility;

approach lights, said approach lights including:
- a third luminaire optically connected to said at least one illuminator, said third luminaire emitting a first distinct horizontally orientated distribution of light;
- a fourth luminaire optically connected to said at least one illuminator, said fourth luminaire emitting a second horizontally orientated distribution of light; said first horizontally orientated distribution of light and said second horizontally orientated distribution of light (i) being vertically angularly displaced with respect to each other and (ii) overlapping to define a first horizontally orientated envelope of mutual and distinct visibility; and
- a fifth luminaire optically connected to said at least one illuminator, said fifth luminaire emitting a circular distribution of light.

46. The integrated approach lighting system of claim 45 wherein said luminaires comprise a non-imaging light transformer coupled to a non-Lambertian holographic diffuser.

47. A method of guiding an aircraft on approach to a runway, said runway having a threshold and an extended centerline, said method comprising the steps of:

providing first and second stationary luminaires;

generating light energy with an illuminator;

emitting, with said first luminaire and from near said runway threshold, a first vertically orientated distribution of light along and adjacent one side of said extended centerline;

emitting, with said second luminaire and from near said runway threshold, a second vertically orientated distribution of light on the other side of and adjacent said extended centerline;

said first vertically orientated distribution of light and said second vertically orientated distribution of light overlapping each other so as to define a first vertically orientated envelope centered on said extended centerline and in which both said first and second vertically orientated distributions of light are visible to an aircraft on said extended centerline; transmitting at least a portion of the light energy to each of said first and second luminaries via independent and corresponding fiber optic cables, each said cable having an input end and a distal output end coupled to a corresponding one of said first and second luminaires; shaping the light energy with each of said first and second luminaires; and wherein said shaping step includes using a non-lambertian holographic diffuser and a non-imaging light transformer optically coupled to a corresponding one of said distal output ends of said fiber optic cables to reduce a divergence angle of the light energy emitted at said distal output end.

48. A method of guiding an aircraft on approach to a runway, said runway having an extended centerline and said approach having a nominal glide path, said method comprising the steps of:

providing first and second stationary luminaires, and an illuminator to supply light energy to said first and second luminaries;

emitting, with said first luminaire, a first horizontally orientated distribution of light above and adjacent said nominal glide path;

emitting, with said second luminaire, a second horizontally orientated distribution of light below and adjacent said nominal glide path;

transmitting at least a portion of the light energy to each of said first and second luminaires via independent and corresponding fiber optic cables, each said cable having an input end and a distal output end coupled to a corresponding one of said first and second luminaires;

shaping the light energy with each of said first and second luminaires;

said first and second horizontally orientated distributions of light overlapping each other to define a first horizontally orientated envelope centered on said nominal glide path and in which both said first and second horizontally orientated distributions of light are visible to an aircraft on said nominal glide path; and wherein said shaping step includes using a non-lambertian holographic diffuser and a non-imaging light transformer optically coupled to a corresponding one of said distal output ends of said fiber optic cables to reduce a divergence angle of the light energy emitted at said distal output end.

* * * * *